Figure 1:
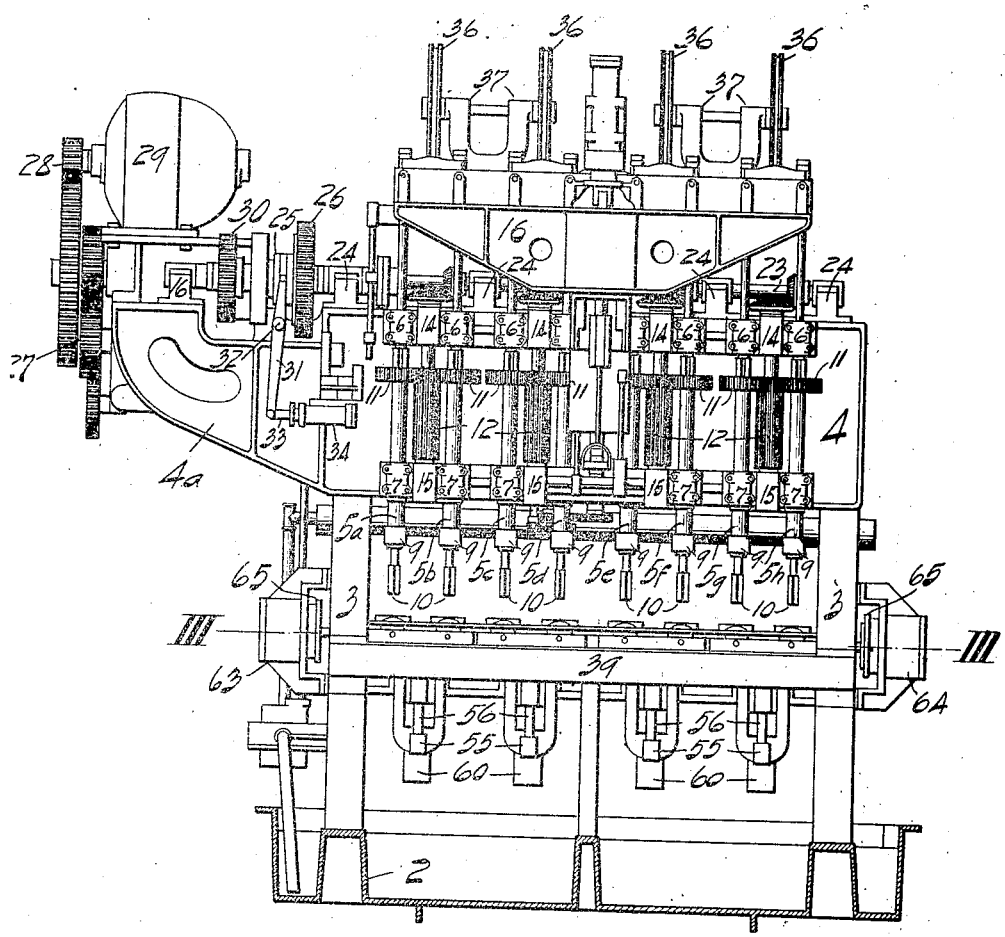

J. H. BAKER, E. HENSEN & O. M. MOWAT.
COUPLING TAPPING MACHINE.
APPLICATION FILED OCT. 10, 1911.

1,085,785.

Patented Feb. 3, 1914.

7 SHEETS—SHEET 1.

J. H. BAKER, E. HENSEN & O. M. MOWAT.
COUPLING TAPPING MACHINE.
APPLICATION FILED OCT. 10, 1911.

1,085,785.

Patented Feb. 3, 1914.
7 SHEETS—SHEET 2.

WITNESSES

INVENTORS

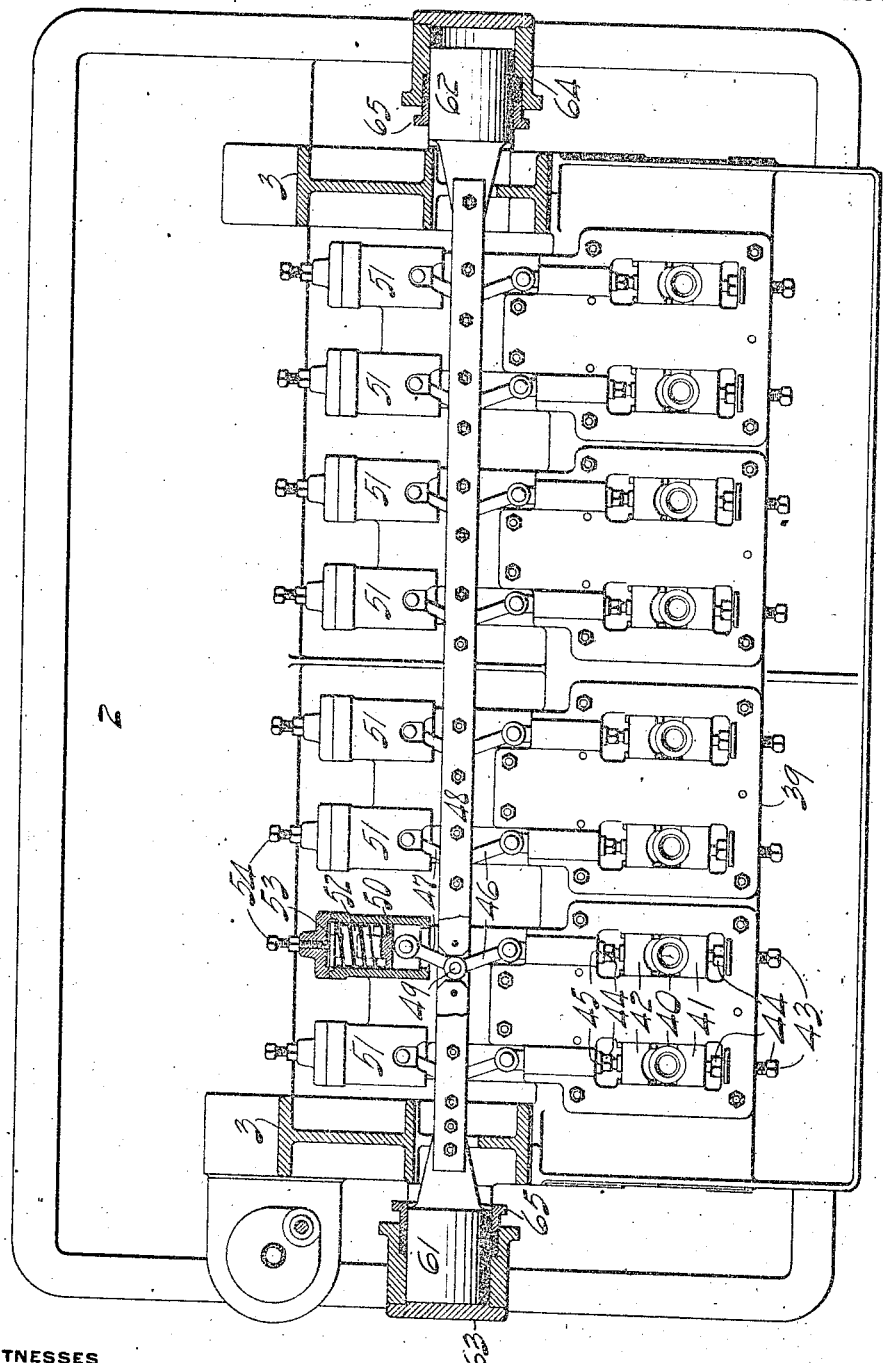

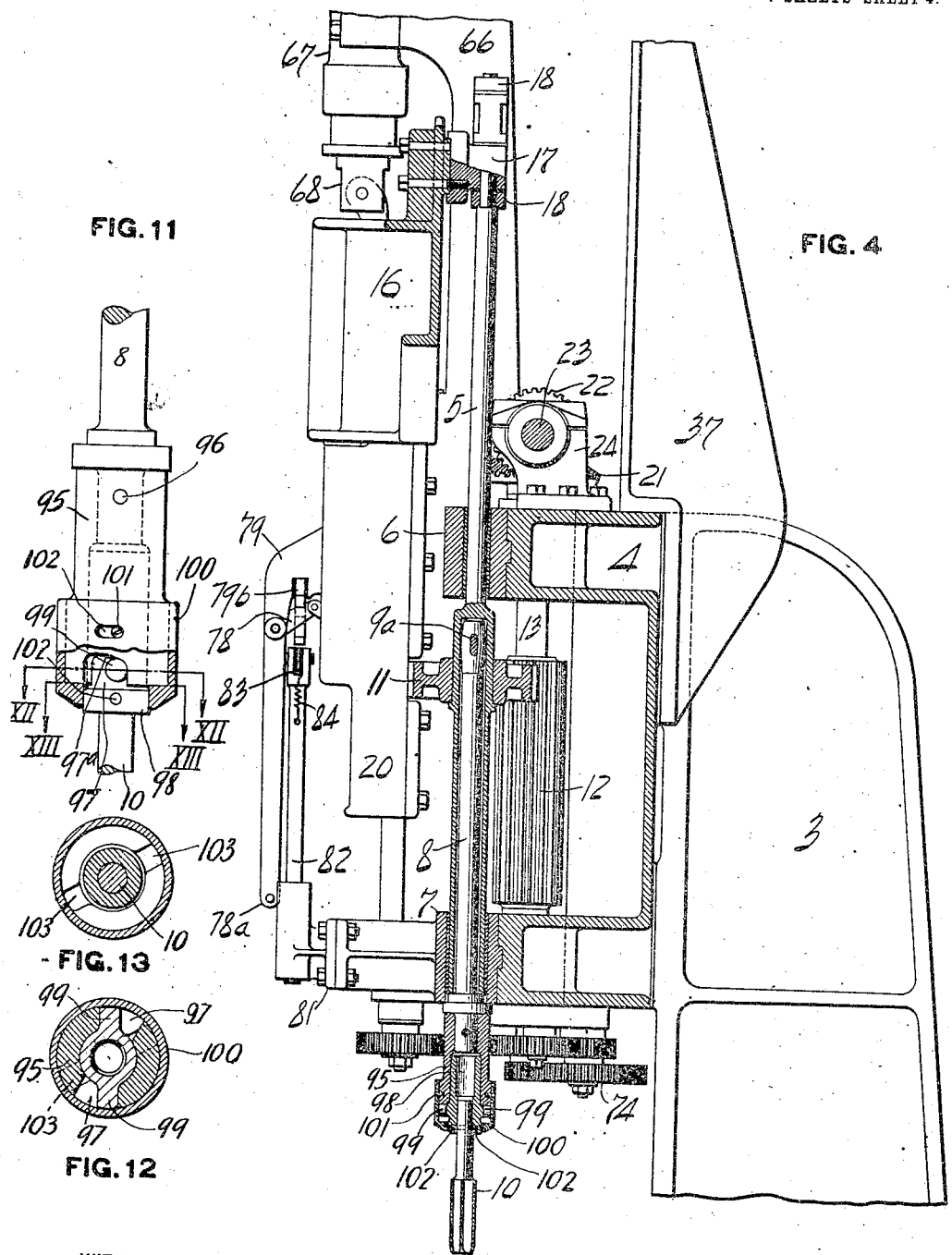

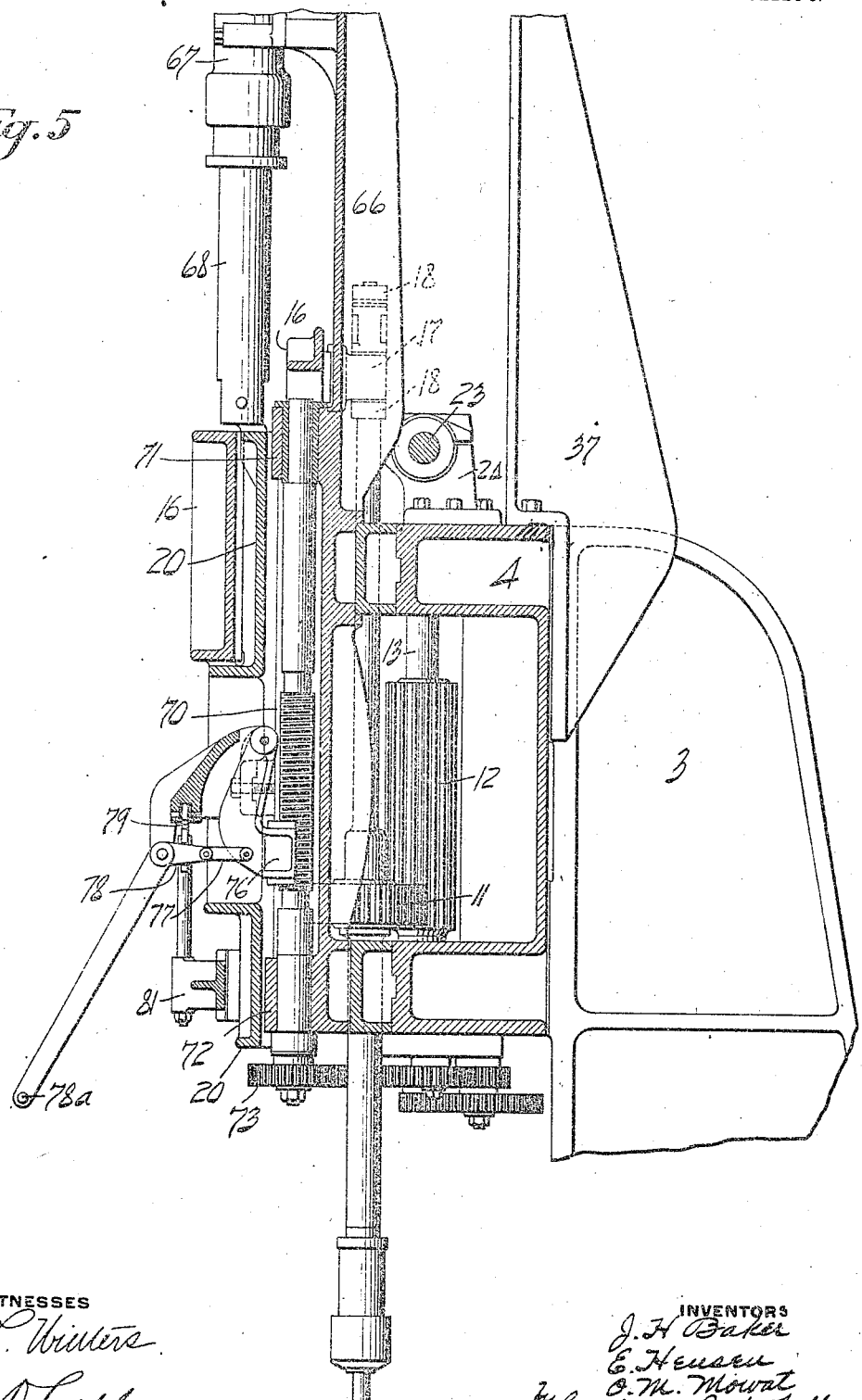

J. H. BAKER, E. HENSEN & O. M. MOWAT.
COUPLING TAPPING MACHINE.
APPLICATION FILED OCT. 10, 1911.

1,085,785.

Patented Feb. 3, 1914.

7 SHEETS—SHEET 6.

WITNESSES
J. L. Winters
R. D. Little

INVENTORS
J. H. Baker
E. Hensen
O. M. Mowat
by Linthicum, Belt & Fuller
their Attorneys J. H. BAKER, E. HENSEN & O. M. MOWAT.
COUPLING TAPPING MACHINE.
APPLICATION FILED OCT. 10, 1911.
1,085,785.
Patented Feb. 3, 1914.
7 SHEETS—SHEET 7.
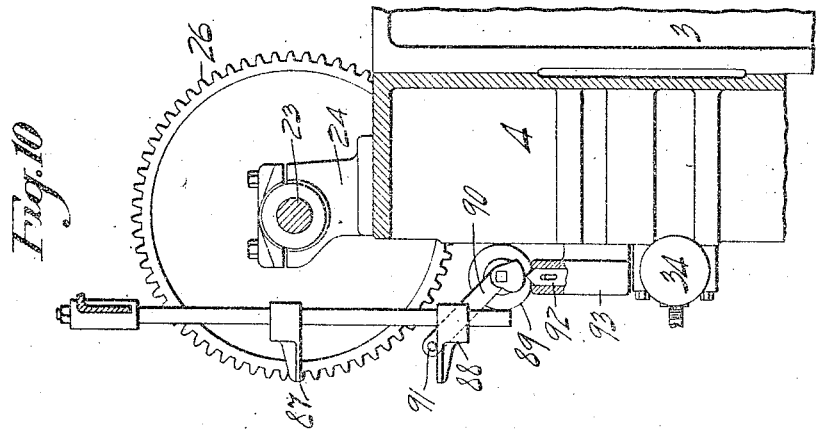
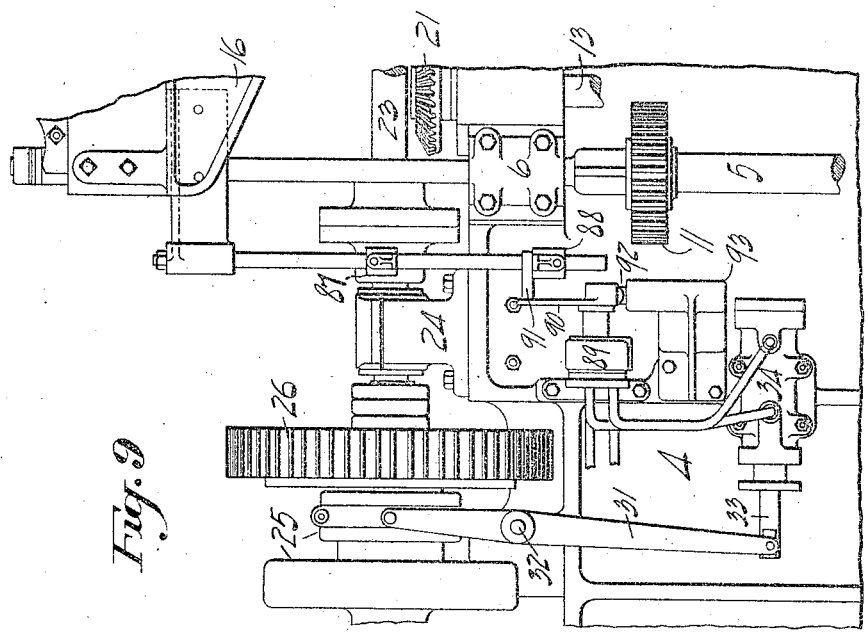

UNITED STATES PATENT OFFICE.

JONATHAN H. BAKER, EMIL HENSEN, AND OLIVER M. MOWAT, OF McKEESPORT, PENNSYLVANIA, ASSIGNORS TO NATIONAL TUBE COMPANY, OF PITTSBURGH, PENNSYLVANIA, A CORPORATION OF NEW JERSEY.

COUPLING-TAPPING MACHINE.

1,085,785.   Specification of Letters Patent.   Patented Feb. 3, 1914.

Application filed October 10, 1911. Serial No. 853,874.

*To all whom it may concern:*

Be it known that we, JONATHAN H. BAKER, EMIL HENSEN, and OLIVER M. MOWAT, citizens of the United States, residing at McKeesport, in the county of Allegheny and State of Pennsylvania, have invented a new and useful Coupling-Tapping Machine, of which the following is a specification.

Our invention relates to apparatus for tapping or cutting screw threads on the interior of pipe couplings and similar hollow cylindrical articles.

One object of our invention is to provide a multiple spindle tapping machine having novel means for simultaneously tapping a plurality of couplings or like articles and another object of the invention is to provide a multiple spindle tapping machine having improved means for driving the plurality of taps employed whereby the threads cut by the tapping operations are formed concentric with the opening or hole through the couplings.

Another object of our invention is to provide a tap holding mechanism having novel means whereby a slight vertical movement of the taps relative to the spindles is effected in unscrewing the taps from the threaded couplings and stripping or other damage to the threads is avoided and prevented in unscrewing or removing the taps therefrom after completing the coupling tapping operations.

A further object of this invention is to provide a multiple spindle tapping machine having coupling gripping mechanism of novel construction whereby a plurality of pipe couplings are simultaneously gripped and are securely held against rotation notwithstanding slight irregularities or inequalities in the diameter or wall thickness in the couplings being grasped and whereby stoppage or possible breakage of other damage to the apparatus by reason of failure to hold one or more of a series of couplings in engagement with the gripping mechanism is overcome and prevented.

A still further object of the invention is to provide a multiple spindle tapping machine having the novel combination and arrangement of parts as will more fully appear hereinafter.

Figure 2:
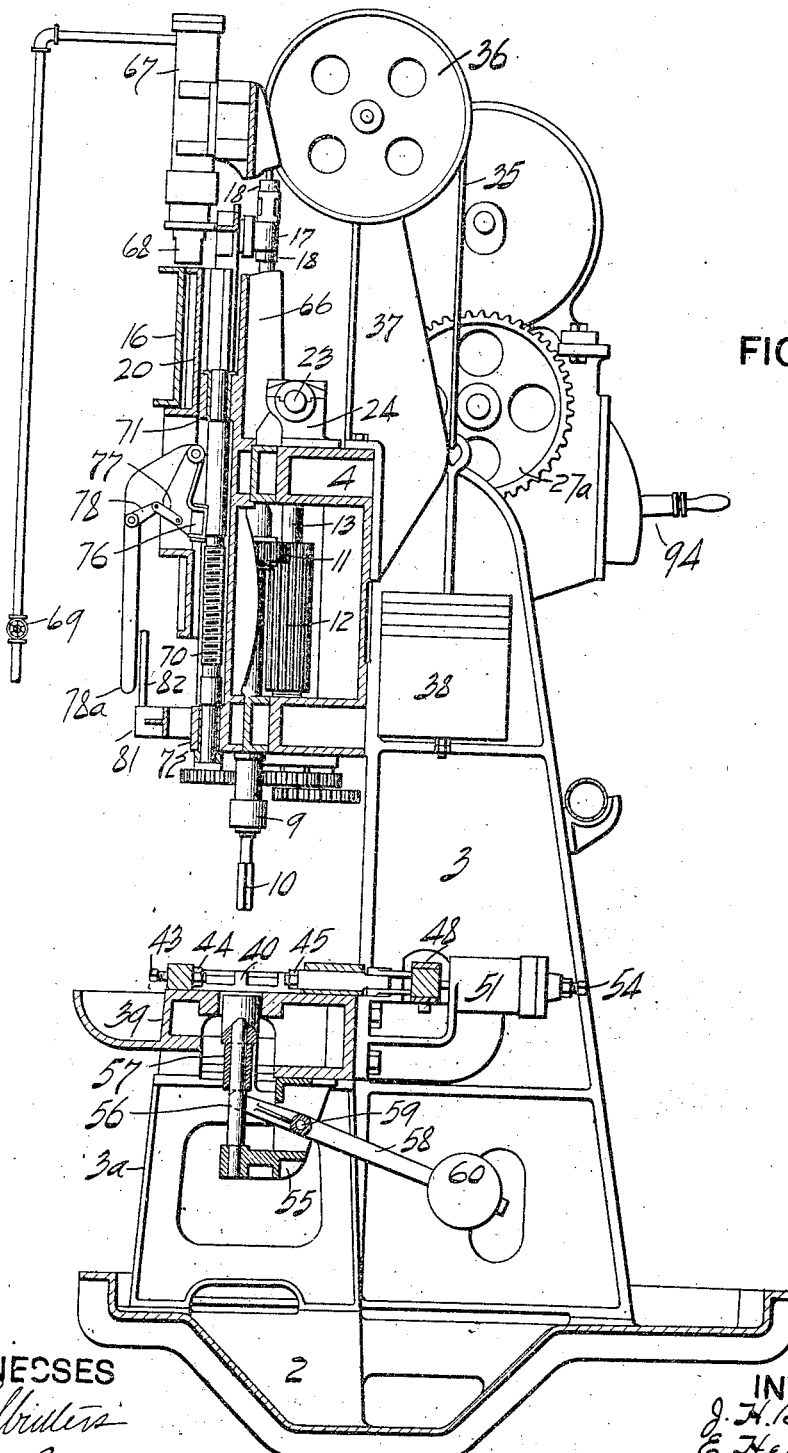
Figure 8:
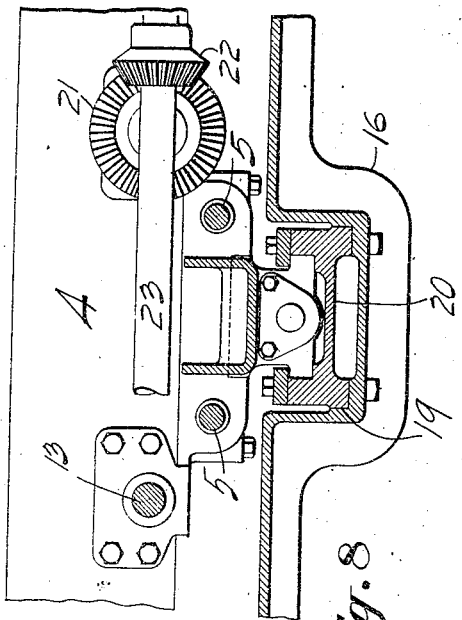
Figure 7:
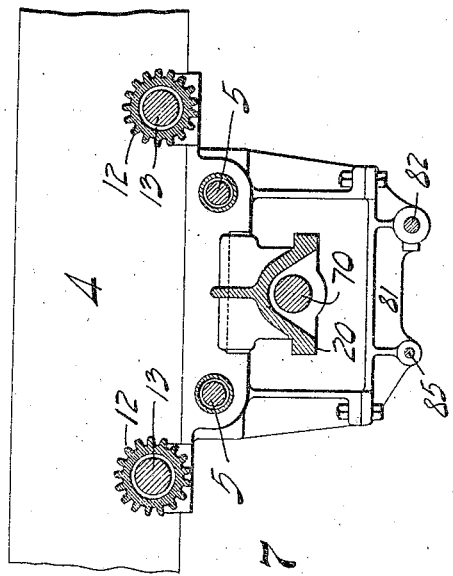
Figure 6:
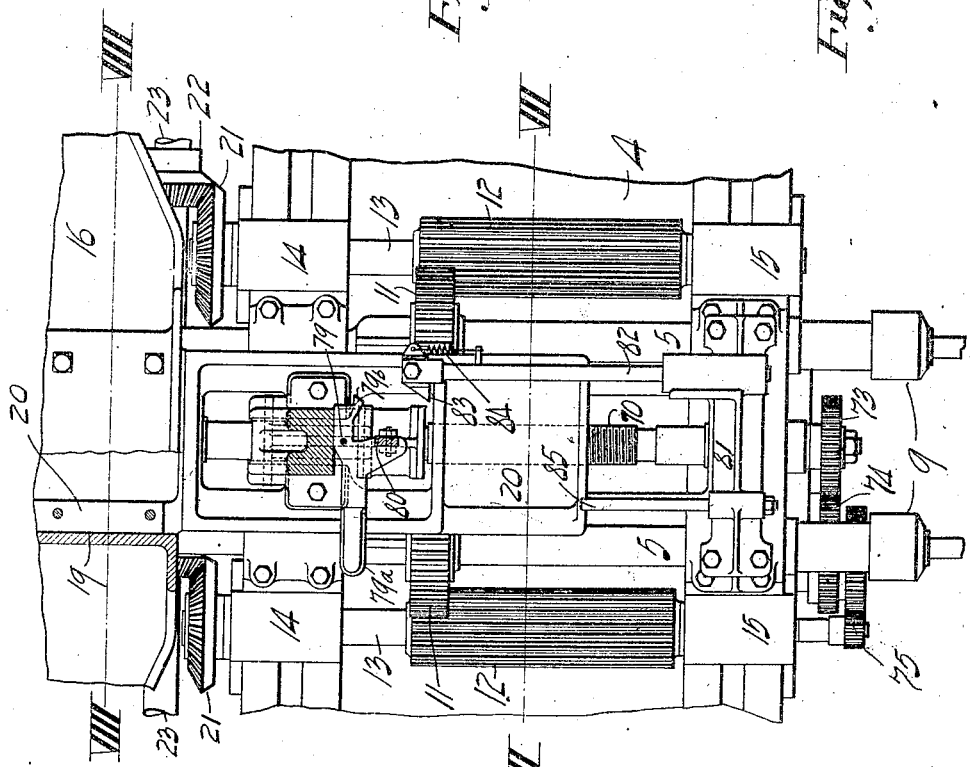

Referring to the accompanying drawings forming part of this specification, Figure 1 is a front elevation showing a multiple spindle tapping machine constructed and arranged in accordance with our invention. Fig. 2 is a sectional side elevation of the apparatus shown in Fig. 1. Fig. 3 is a sectional plan on the irregular line III—III of Fig. 1, showing the gripping mechanism by which the couplings are grasped and held against rotation. Fig. 4 is a detail sectional side elevation showing the spindle feeding mechanism in its raised or inoperative position. Fig. 5 is a detail sectional side elevation showing the spindles in lowered position, or position at or about the completion of the coupling tapping operations. Fig. 6 is a front elevation partly in section showing a detail of the spindle driving mechanism and the feed mechanism by which the spindles are advanced or moved downwardly during the thread cutting operations. Fig. 7 is a sectional plan on the line VII—VII of Fig. 6. Fig. 8 is a sectional plan on the line VIII—VIII of Fig. 6 showing the arrangement of the slides and guide for the vertically movable cross arm forming the spindle supporting mechanism. Fig. 9 is a front elevation showing a detail of the friction clutch connections between the driving motor and spindle driving shaft and the clutch operating mechanism. Fig. 10 is a sectional side elevation of the mechanism shown in Fig. 9. Fig. 11 is a detail elevation, partly in section, showing the construction of the chuck mechanism for securing the taps in place on the spindles. Fig. 12 is a sectional plan of the apparatus shown in Fig. 11, the section being taken on the line XII—XII of Fig. 11. Fig. 13 is a sectional plan similar to Fig. 12, the section being taken on the line XIII—XIII of Fig. 11.

In the drawings, 2 designates the base plate of the taping machine which is secured in the desired location on a suitable foundation provided for that purpose. The base plate as shown is provided with upwardly extending flanges on its marginal edges and with depressed portions forming an oil pan or trough. Housings or standards 3 which are bolted or otherwise secured to the base plate have their upper ends rigidly fastened together by the horizontally extending cross arm 4, this cross arm, which is stationary, also serving to support or carry the vertically movable spindles 5 and spindle rotating mechanism. The front face of the cross arm 4 is provided with bearings 6 and 7 in which the tap carrying spindles $5^a$, $5^b$, $5^c$, $5^d$, $5^e$, $5^f$, $5^g$, $5^h$, are mounted so as to be vertically movable as well as rotatable. The lower portions of the spindles 5, which extend through the bearings 7, are enlarged in diameter and are provided with axially extending recesses or holes.

A rod or bar 8 having a tap holding chuck 9 on its lower end is inserted in the axial opening or recess in the lower end of each spindle 5. These bars 8 are secured at their upper ends by pins $9^a$ to the spindles 5 so as to be positively turned or rotated therewith. Taps 10 which may be of any one of various sizes depending upon the size of the pipe couplings to be threaded are detachably secured in the tap holding chucks 9.

In the construction of the tap holding chuck 9, (as will be best seen by reference to Figs. 4, 11, 12 and 13) the lower ends of the rods 8 in the hollow spindles 5 have a hollow driving head 95 secured thereon by a pin 96. The bottom edge of the head 95 has a transverse recess or groove 97 therein, the bottom surface $97^a$ of which is inclined lengthwise. Secured in the axial opening of the driving head 95 is a hollow tap driving collet 98, having radially extending shoulders or lugs 99 projecting from opposite sides of the center thereof. The lugs 99 project into the recess 97 and by engagement with the sides of the recess 97 in the lower edge of the driving heads 95 are positively rotated by the heads when the heads 95 are rotated by the spindles 5. A collar or cap 100 is secured to the lower ends of the heads to retain the collets 98 in place in the heads 95, being held in place by the screws 101 which extend into the slots 102 in the collars or caps 100 and prevent relative vertical movement while permitting a limited axial movement of the collar on the driving head 95. The shanks of the taps 10 are secured to the collets 98 by pins 102 and a slotted recess 103 in the bottom of the collars permits the collets 98 to be removed from the driving head 95 when the collar 100 is rotated into the proper position on the head 95.

The rods 8 are made slightly smaller in diameter than the longitudinal openings in the end of the spindles 5 in which they are placed so as to permit the taps 10 to "float" or rotate in a path slightly eccentric to the axes of rotation of the spindles 5. This eccentric movement of the chucks and taps enables the individual taps to cut threads concentric with the interior of pipe couplings or other articles when not in exact alinement with the vertical axis of the couplings.

Each spindle 5 is provided at an intermediate point in its length with a spur gear 11 keyed thereto which meshes with and is driven by one of the four wide face spur pinions 12 which are keyed or otherwise secured on pinion shafts 13 rotatably mounted in bearings 14 and 15 on the cross arm 4.

A horizontally extending vertically movable cross arm 16 by which the spindles 5 are caused to move in unison in a lengthwise or vertical direction, is provided in front of the stationary cross arm 4, bearings 17 on the rear face of the cross arm 16 connecting the upper ends of the spindles 5 to the cross arm 16. Collars 18 are secured on the upper end of the spindles 5 to engage with the opposite ends of the bearings 17 and maintain the rotary spindles in place on the movable cross arm 16. The cross arm 16 has a guideway 19 engaging the slide 20 on the front face of the stationary cross arm 4 to cause the cross arm 16 to move in a path parallel with the vertical axes of the spindles 5 which slide lengthwise in the spindle bearings 6 and 7 during the coupling tapping operations.

The upper end of each pinion shaft 13 is provided with a bevel gear 21 which meshes with one of the smaller bevel gears 22 on the horizontal driving shaft 23 which is provided at intervals in its length with bearings 24 secured on the top of the cross arm 4. The spindles 5 are arranged in four pairs, $5^a$ and $5^b$, $5^c$ and $5^d$, $5^e$ and $5^f$, $5^g$ and $5^h$, each pair being driven by one of the wide faced spur pinions 12. The spur pinions 12 have faces of sufficient width to mesh with the gears 11 and drive the spindles 5 when in any position within the range of vertical movement of the spindles.

A reversing friction clutch 25 is employed to operatively connect the spindle driving shaft 23 to the spur gear 26 loosely mounted on the shaft 23 and connected by the gear $27^a$ and train of slow down gearing 27 with the driving pinion 28 on the armature shaft of the driving motor 29 in driving the shaft 23 and spindles in one direction. The clutch 25 is also arranged to operatively connect the spur gear 30 with the shaft 23, this gear 30 also being loosely mounted on the shaft 23 and being operatively connected with the slow down gearing 27 so as to be positively rotated in the opposite direction to the spur gear 26 by the constant speed, continuously rotating, driving motor 29.

The movable friction member of the friction clutch 25 is actuated by the lever 31 which is pivoted intermediate of its ends to the pin 32 on the stationary cross arm 4 and the lower end of the lever 31 is operatively connected to the piston rod 33 of the double acting fluid pressure cylinder 34 secured on the cross arm 4. The overhung extension $4^a$ on the cross arm 4 provides means to support the driving motor 29 and driving gears, as will be best seen by reference to Fig. 1.

A pair of gripping jaws 41, 42, is mounted in each slot or opening 40 so as to be horizontally movable therein, each jaw being adjustable toward and away from its opposing jaw and the jaws having inserted bits engaging with the couplings so as to permit pipe couplings of various sizes being held in axial alinement with the spindles. The jaw members 41 of each pair are adjustably held in the slots 40 by the adjusting screws 43 and lock nuts 44 are employed to secure the screws 43 in adjusted position. The opposing jaw members 42 of each pair are connected by adjusting screws 44ª to one end of the sliding bars 45 movably secured on the top of the table 39. The opposite end of the bars 45 are pivoted to one end of the toggle links 46 and one end of each of these links 46 is pivotally connected to one end of the toggle links 47 and to the toggle actuating bar 48 by pins 49. One end of each toggle link 47 is pivotally connected to spring followers 50 mounted in the front end of the spring boxes 51 which are secured to the rear side of the table 39.

A helical spring 52 is located in each spring box 51 between the front followers 50 and rear followers 53 and an adjusting screw 54 is secured in the rear end of the boxes 51 to vary the amount of compression on the springs and enable the couplings being yieldingly held against rotation between the jaws of the gripping mechanism during the tapping operations. This construction with the removable bits in the jaws which engage the surfaces of the couplings also permits a plurality of the couplings, which may vary slightly in diameter, to be simultaneously grasped and held by pairs of gripping jaws which are actuated all at the same time by means of the reciprocating toggle connecting bar 48 to which the meeting ends of the toggle links 46 and 47 are pivotally attached.

Secured to the under side of the table 39 are brackets 55 each supporting a vertically extending pin or post 56 below the slotted openings 40 in the table and in vertical alinement with the spindles 5 (see Fig. 2). Vertically movable coupling supporting sleeves 57 are loosely mounted on the upper ends of the posts 56 which are held in their lifted position on the posts by engagement with one end of the counterbalance levers 58 pivoted by pins 59 on the brackets 55. The opposite ends of the levers 58 have counterweights 60 of sufficient weight to hold the sleeves 57 in raised position and support couplings placed between the pairs of gripping jaws 41, 42, when the movable gripping jaws have been retracted into their disengaged position.

Occasionally, one or more of any series of couplings being tapped will be so much smaller in diameter than others in the same series as to not be grasped and held against rotation by the gripping jaws, and as the taps are advanced positively by the lead screw 70 during the coupling tapping operations, unless preventive means are employed serious breakage or other damage to the apparatus will follow when a loose coupling is engaged by the advancing end of the tap. The couplings being yieldingly held against vertically downward movement between the pairs of gripping jaws 41 and 42 by the counterweighted sleeves 57, a coupling when so loosely held as to turn with the tap engaging with its top edge will be forced downwardly with the sleeve by the positively advancing tap 10 and cause the counterweight 60 to lift, so as to in this way prevent otherwise possible serious damage to the apparatus.

The ends of the toggle connecting bar 48 are secured to the pistons or plungers 61 and 62 which are secured in the toggle actuating cylinders 63 and 64 mounted on the sides of the housings 3. The cylinders are provided with the usual stuffing boxes in which the glands 65 are secured to hold the cylinder packing in place.

The vertically movable cross arm 16 is counterbalanced, one end of the cables or flexible connections 35 being attached thereto. The cables 35 are passed over sheave wheels or pulleys 36 revolubly mounted on the tops of bearing stands 37 which are fixed to the top of the stationary cross arm 4 and the other ends of these cables 35 are secured to the counterweights 38. The counterweights 38 are made of sufficient weight to more than balance the movable crosshead 16 and parts attached to and movable therewith so that unless held or restrained, the counterweights 38 will lift the cross arm 16.

A horizontal table 39 on which the couplings are supported during the tapping operations is rigidly secured in place below the spindles 5 on brackets 3ª formed integral with the lower portion of the housings 3. This table is provided with a series of slotted openings or holes 40, one of these openings being located beneath each of the spindles 5.

Mounted on an upwardly extending support 66 secured to the stationary cross arm 4 is a fluid pressure cylinder 67 having a downwardly projecting piston 68 to the lower end of which the vertically adjustable cross arm 16 is secured through the guide way 19. The cylinder 67 is arranged to quickly move the cross arm 16 with the spindles 5 and other attached parts downwardly sufficiently to bring the lower end of the taps 10 into engagement with the couplings or other articles to be tapped. A manually operated valve 69 is provided to connect the upper end of the cylinder 67 with a source of fluid pressure and is arranged in such manner as to admit and shut off fluid pressure to the cylinder 67 and to permit escape of fluid pressure from the cylinder 67 when the crosshead is to be lifted into its raised position by the counterweights 38.

A vertical lead screw 70 is mounted in bearings 71—72 on the stationary cross arm 4 and keyed or otherwise secured to the lower end of this lead screw is a spur gear wheel 73 which meshes with and is driven by the train of slow down gears 74, rotatably secured by stub shafts or pins to the under side of the cross arm 4. The slow down gears 74 are driven by the spur pinion 75 which is secured on the lower end of one of the pinion shafts 13 for the spindle driving pinions 12. (See Figs. 1 and 6).

A half nut 76 pivotally secured to the movable cross arm 16 employed to operatively connect this cross-arm with the lead screw 70 is arranged to be moved into engagement with the screw threads on the lead screw 5 in the coupling tapping operations and in the reverse or upward movement necessary to unscrew the taps from the threading couplings at the completion of each tapping operation. The lower end of the pivoted half nut 76 is connected by means of a link 77 to one end of the bent lever 78 which is pivoted at an intermediate point in its length to the lug 79 on the movable cross arm 16. The lower end 78ª of the lever arm 78 is provided with a handle by which it is lifted to move the half nut 76 into operative engagement with the lead screw 70.

A tilting latch 79 having a handle 79ª is pivoted to the bracket on the cross arm 16 and has a recess 80 on its depending lower end, the side edges of which are arranged to embrace the upper end of and hold the lever arm 78 in position to maintain the half nut 76 in engagement with the lead screw. (See Figs. 2, 4, 5 and 6).

Adjustably secured on the bracket 81 extending from the stationary cross arm 4 is a vertical post 82 having a trigger 83 on its upper end. This trigger 83 is arranged to tilt when the inclined face of the tilting latch 79 engages therewith in the downward movement of the cross arm 16 so as to permit the latch 79 to pass the trigger 83 freely. The helical spring 84 is secured to one end of the trigger 83 to return it to the position shown in Fig. 6, after being tilted by the latch 79. The trigger 83 is adjusted vertically with its post 82 so as to engage with the offset or jog 79ᵇ on the outer end of the tilting latch 79 and trip this latch at the desired point in the upward movement of the cross arm 16 and taps 10, as the cross arm 16 is being lifted by the action of the lead screw 70 to release the lever arm 78 and cause the half nut 76 to become disengaged from the lead screw 70 when the taps 10 are retracted a sufficient distance to have become disengaged from the tapped couplings. The bracket on the cross arm 4 is also provided with a vertical post 85 which is vertically adjustable and which will engage with the handled portion 79ª of the latch 79 when the cross arm 16 has reached the extreme limit of its downward or tapping movement and will disengage the latch from the upper end of the pivoted lever 78, so as to cause disengagement of the half nut and lead screw and prevent damage caused by further downward movement of the taps 10. When so released the weight of the lever 78 causes it to move by gravity from the position shown in Fig. 5 into that shown in Figs. 2 and 4, and, by such movement disengage the half nut 76 from the screw threads of the lead screw 70.

Secured to one end of the horizontal vertically moving cross arm 16 is a downwardly extending rod or shaft 86 having dogs or tappets 87 and 88 adjustably secured at separated points thereon. The valve 89 which is operatively connected to the opposite ends of the fluid pressure cylinder 34 used in operating the reversing friction clutch 25, is provided with a lever 90 having a pin 91 projecting from its outer end. This pin 91 extends outwardly so as to be engaged by the tappets 87 and 88 so as to move the lever 90 and through the valve stem manipulate the valve 89 to admit fluid pressure to one end or the other of the cylinder 34. A rod 92 which engages with a helical spring in the rod support 93 on the cross arm 4 has its upper end arranged to engage with and frictionally hold the valve stem and its lever 90 in any position to which it is moved by the tappets 87 and 88 during the operation of the apparatus.

The operation of the apparatus is as follows: The chucks 9 are supplied with taps 10 of the required size. The change gears are adjusted by the handle 94 projecting from the change gear box so as to cause the spindles 5 and the lead screw 70 to rotate at a speed corresponding to that required in cutting threads of the pitch of the threads to be tapped in the coupling. The dogs or tappets 88 are also adjusted into position to actuate the valve 89 controlling the movement of the friction clutch 25 on the spindle driving mechanism at the time necessary in tapping couplings of the width being operated upon and the actuating mechanism for tripping the lead screw half nut 76 operating mechanism is also adjusted to the required position. The cross arm 27 is then caused to lift by manually shutting off the supply of fluid pressure to the operating cylinder 65. The counterweights 35 being of sufficient weight to more than counterbalance the cross arm 27, this arm is quickly raised or lifted into its retracted position (that shown in Figs. 1, 2 and 4) when the supply of fluid pressure is shut off from the cylinder 65. Untapped couplings are then placed in position between each pair of co-acting gripping jaws 41,—42, when fluid pressure is admitted to the jaw operating cylinder located on the left of Fig. 3 and the toggle connecting arm is moved from right to left. (Fig. 3) such movement causing the gripping jaws to grasp and hold the couplings in place on the coupling supporting table 39. The operator then manipulates the operating valve 69 manually so as to admit fluid pressure to the cylinder 65 and causes the plunger 66 in this cylinder to move the cross arm 16 downwardly into a position which will bring the lower ends of the taps 10 secured to the lower end of the spindles 5 in close proximity to the upper ends of the couplings to be tapped. The half nut 76 is then moved manually by lifting the lever arm 78 so as to be in engagement with the screw threads on the lead screw 70 and the movable cross arm 16 and spindles 5 supported therefrom are caused to move downwardly at a rate of speed corresponding to the pitch of the threads being cut on the couplings by the taps. When the taps 10 engage with the upper ends of the couplings being tapped the lugs 99 on the collets 98 are moved in the slots or grooves 97 in the bottom edge of the driving heads 95, this movement causing the lugs by engagement with the inclined bottom surface 97ᵃ of the grooves 97 to move the collets 98 into the position shown in Fig. 11. When in such position further relative movement of the collets and driving heads is prevented during the tapping operations. After the feed screw has moved the taps through the couplings so as to form the threads thereon the upper tappet or dog 88 will have moved the valve lever 90 into position to admit fluid pressure to one end of the cylinder 34 so as to cause the piston 33 in the cylinder 34 to actuate the clutch lever 31 and throw the clutch into position to reverse the direction of rotation of the spindle driving shaft 23 and spindles 5, thereby causing the taps 10 to "back out" or unscrew from the then tapped or threaded couplings. Should, for any reason, the clutch fail to operate to reverse the spindles when the operation of tapping the couplings has been completed, continued movement of the cross arm 16 will cause the handled end 79ᵃ of the latch 79 to engage with the upper end of the post or rod 85, and by such engagement trip the latch 79 and cause the half nut to be disengaged from the lead screw 70, in this way preventing further downward movement of the tapping spindles. After the tapping machine is reversed, (when the spindles will be rotated in a counter-clockwise direction), to unscrew the taps from the tapped couplings the spindles 5 and driving heads 95 at the beginning of the reverse movement move axially relatively to the collet 98. This movement shifts the collet lugs 99 in the grooves or recesses 97 until in engagement with the opposite end of the grooves from that shown in Fig. 11, so that a slight vertical movement of the collet in the head is effected and stripping of the threads in the couplings in unscrewing the taps therefrom is avoided and prevented by permitting the slight vertical movement of the tap independent of the movement of the spindle and driving head. As the feed screw 70 moves the cross arm 16 upwardly the trigger 83 engages with the jog or offset 79ᵇ on the outer end of the tilting latch 79 and further movement of the cross arm will trip the latch 79 so as to release the lever arm 78 and disengage the half nut 76 from the lead screw 70. After the taps are unscrewed or lifted to be clear of the couplings and the latch 79 has been tripped, the taps and spindles are then more rapidly lifted by disengagement of the half nut from the lead screw and by shutting off fluid pressure from the upper end of the cross arm actuating cylinder 65, the counterweights 35 acting to quickly lift the cross arm 27. The tapped couplings are then removed from between the gripping jaws and replaced by other untapped couplings. The cross arm is then again caused to descend after the gripping mechanism is caused to grasp the new lot of couplings until the taps are engaged by the upper ends of the couplings.

The advantages of our invention will be apparent to those skilled in the art. By means of our improved coupling gripping mechanism the couplings are yieldingly held against rotation during the tapping operations.

The gripping mechanism is easily and quickly adjusted to suit couplings of various sizes. The coupling tapping mechanism is adapted for quick adjustment in moving the spindles to bring the taps into and out of cutting position relative to the couplings.

Modifications in the construction and arrangement of the parts may be made without departing from our invention as defined in the appended claims.

We claim:—

1. In a tapping machine the combination with a plurality of rotatable, lengthwise movable spindles, having taps on one end thereof, of means for simultaneously moving the spindles lengthwise to bring the taps into engagement with the articles to be tapped, independent means for simultaneously moving the spindles lengthwise arranged to control and cause lengthwise travel of the spindles at a speed corresponding to the pitch of the threads being tapped, and mechanism for simultaneously moving said spindles and taps lengthwise out of engagement with said articles.

2. In a tapping machine the combination with a plurality of rotatable, lengthwise movable spindles, having taps on one end thereof, of means for simultaneously moving the spindles lengthwise to bring the taps into engagement with the articles to be tapped, independent means for simultaneously moving the spindles lengthwise arranged to control and cause lengthwise travel of the spindles at a speed corresponding to the pitch of the threads being tapped, mechanism for simultaneously moving said spindles and taps lengthwise out of engagement with said articles and mechanism arranged to detach the independent spindle moving means after a pre-determined length of travel.

3. In a tapping machine the combination with a plurality of rotatable, lengthwise movable spindles, having taps on one end thereof, of means for simultaneously moving the spindles lengthwise to bring the taps into engagement with the articles to be tapped, independent means for simultaneously moving the spindles lengthwise arranged to control and cause lengthwise travel of the spindles at a speed corresponding to the pitch of the threads being tapped, mechanism for simultaneously moving said spindles and taps lengthwise out of engagement with said articles, mechanism arranged to detach the independent spindles moving means after a pre-determined length of travel and a safety mechanism arranged to limit the downward travel of the spindles.

4. In a pipe coupling tapping machine, the combination with a plurality of rotatable and lengthwise movable spindles having taps on one end thereof and gripping mechanism arranged to grasp and hold a plurality of couplings against rotation while being tapped, of mechanism for simultaneously moving the spindles lengthwise into engagement with the couplings, means for moving the spindles and taps out of engagement therewith and a second spindle moving mechanism having independent means for moving the spindles simultaneously lengthwise during the thread cutting operations, said second mechanism being arranged to reverse the direction of movement of the spindles after cutting a pre-determined length of thread on the couplings to move the spindles upwardly at a speed corresponding to the pitch of the threads on the taps secured to the spindles.

5. In a tapping machine, the combination with a plurality of rotatable and lengthwise reciprocable spindles having taps secured to one end thereof and gripping mechanism arranged to grasp and hold a plurality of couplings against rotation while being tapped, of means for simultaneously reciprocating the spindles lengthwise, independent means for simultaneously imparting lengthwise movement to the spindles, means arranged to reverse the direction of movement of the spindles after cutting a predetermined length of thread on the couplings at a speed corresponding to the pitch of the threads on the taps and means arranged to detach the independent spindle moving means after a regulated amount of travel.

6. In a tapping machine the combination with a plurality of rotatable and lengthwise movable tap supporting spindles, mechanism for rotating the spindles and means for imparting a simultaneous lengthwise movement to the spindles, of a plurality of sets of gripping jaws arranged to grasp and hold couplings against rotation during the tapping operations and means for yieldingly supporting the couplings in position between the retracted gripping jaws, said supports being arranged to yield and move downward with a coupling loosely supported thereon while other of the couplings engaged by the gripping jaws are being tapped.

7. In a tapping machine a spindle having a driving head thereon, a tap secured in said driving head, means on said head permitting a limited lengthwise and axial movement of the tap relative to said driving head, and means for securing the tap to said spindle.

8. In a tapping machine a spindle having a driving head thereon, a tap holding collet in said head and means for detachably securing the collet to said head, said collet and head having means co-acting to permit a limited axial and lengthwise movement of the collet in said head.

In testimony whereof, we have hereunto set our hands.

JONATHAN H. BAKER.
EMIL HENSEN.
OLIVER M. MOWAT.

Witnesses:
  Jas P. Davis,
  J. Ellis Johnston.